(12) United States Patent
Folenta

(10) Patent No.: US 9,756,109 B2
(45) Date of Patent: Sep. 5, 2017

(54) ARCHITECTURE, SYSTEM AND METHOD FOR DYNAMICALLY PROVIDING DIGITAL CONTENT VIA A REFERENCE IMAGE

(71) Applicant: WEBGINES COMMUNICATIONS INC, Buena Park, CA (US)

(72) Inventor: Thomas Folenta, Buena Park, CA (US)

( * ) Notice: Subject to any disclaimer, the term of this patent is extended or adjusted under 35 U.S.C. 154(b) by 26 days.

(21) Appl. No.: 14/433,641

(22) PCT Filed: Nov. 12, 2013

(86) PCT No.: PCT/US2013/069621
§ 371 (c)(1),
(2) Date: Apr. 4, 2015

(87) PCT Pub. No.: WO2014/075048
PCT Pub. Date: May 15, 2014

(65) Prior Publication Data
US 2015/0256588 A1  Sep. 10, 2015

Related U.S. Application Data

(60) Provisional application No. 61/725,459, filed on Nov. 12, 2012.

(51) Int. Cl.
*G06F 15/16* (2006.01)
*H04L 29/08* (2006.01)
*G06F 17/30* (2006.01)

(52) U.S. Cl.
CPC ........ *H04L 67/02* (2013.01); *G06F 17/30879* (2013.01); *G06F 17/30887* (2013.01); *G06F 17/30893* (2013.01)

(58) Field of Classification Search
CPC ............... H04L 67/02; H04L 29/12066; G06F 17/30864; G06F 17/30902; G06F 15/16
USPC ........................... 709/201, 217, 218; 705/14
See application file for complete search history.

(56) References Cited

U.S. PATENT DOCUMENTS

| | | | |
|---|---|---|---|
| 6,591,266 B1* | 7/2003 | Li | G06F 17/30902 |
| 7,058,633 B1* | 6/2006 | Gnagy | G06F 17/30887 |
| 8,838,741 B1* | 9/2014 | Chandra Sekhar | H04L 63/02 709/217 |
| 2003/0030839 A1* | 2/2003 | Walters | H04N 1/00127 358/1.15 |
| 2010/0306249 A1* | 12/2010 | Hill | G06F 17/30867 707/769 |
| 2013/0080498 A1* | 3/2013 | Desilva | H04L 67/22 709/201 |
| 2014/0156702 A1* | 6/2014 | Shyamsunder | G06F 17/30424 707/769 |
| 2014/0214671 A1* | 7/2014 | Desilva | G06Q 20/383 705/44 |
| 2014/0259074 A1* | 9/2014 | Ansari | H04N 21/482 725/50 |
| 2015/0081440 A1* | 3/2015 | Blemaster | G06Q 30/0256 705/14.54 |

* cited by examiner

*Primary Examiner* — Tesfay Yohannes
(74) *Attorney, Agent, or Firm* — Merle W. Richman, Esq.

(57) ABSTRACT

Embodiments of associating a reference image with a URL/URI assigned or related to digital media content are disclosed and enabling a first user to view the associated content via a web browser and reference image reader software and a second user to modify the associated content via a web browser. Other embodiments may be described and claimed.

16 Claims, 14 Drawing Sheets

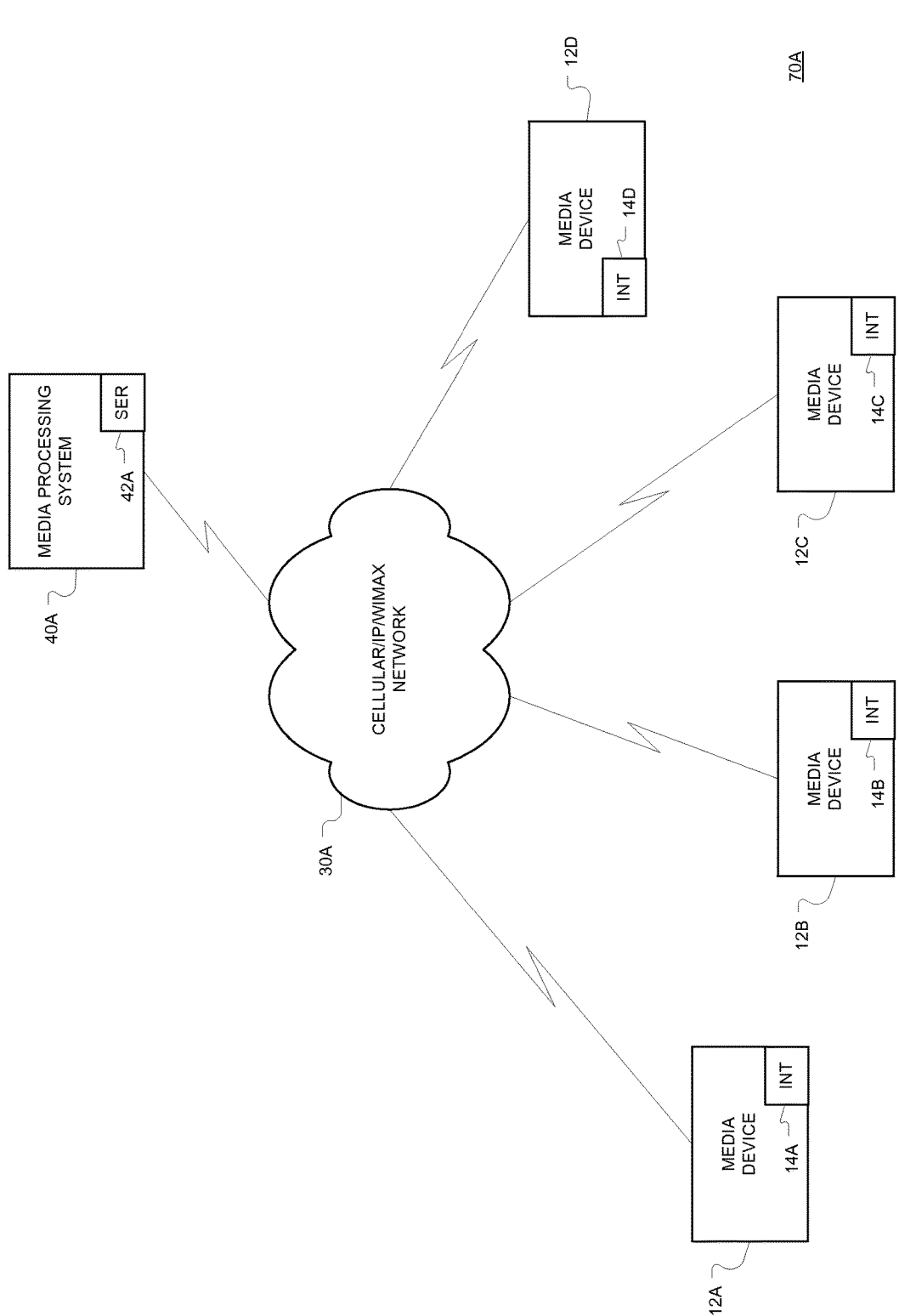

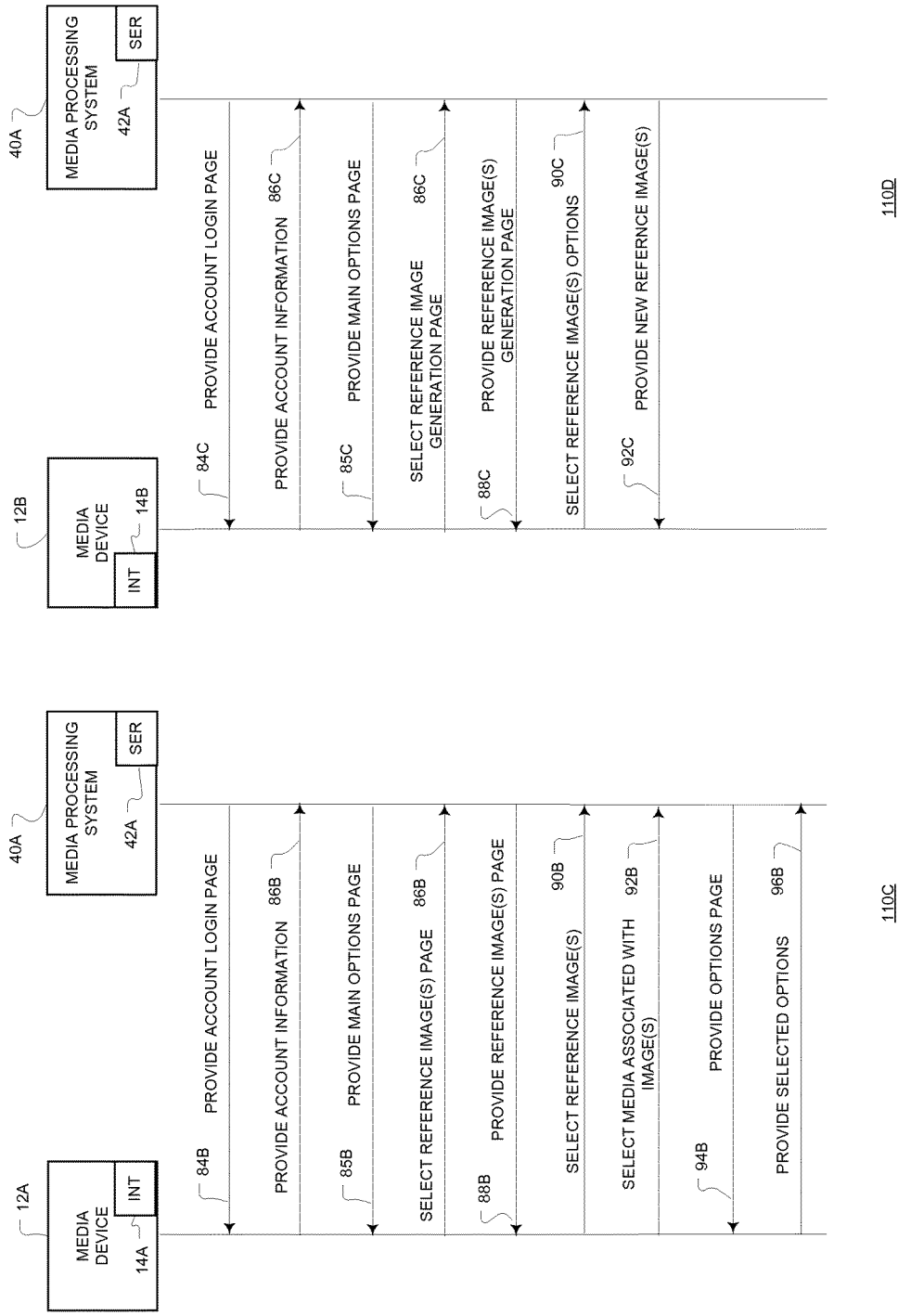

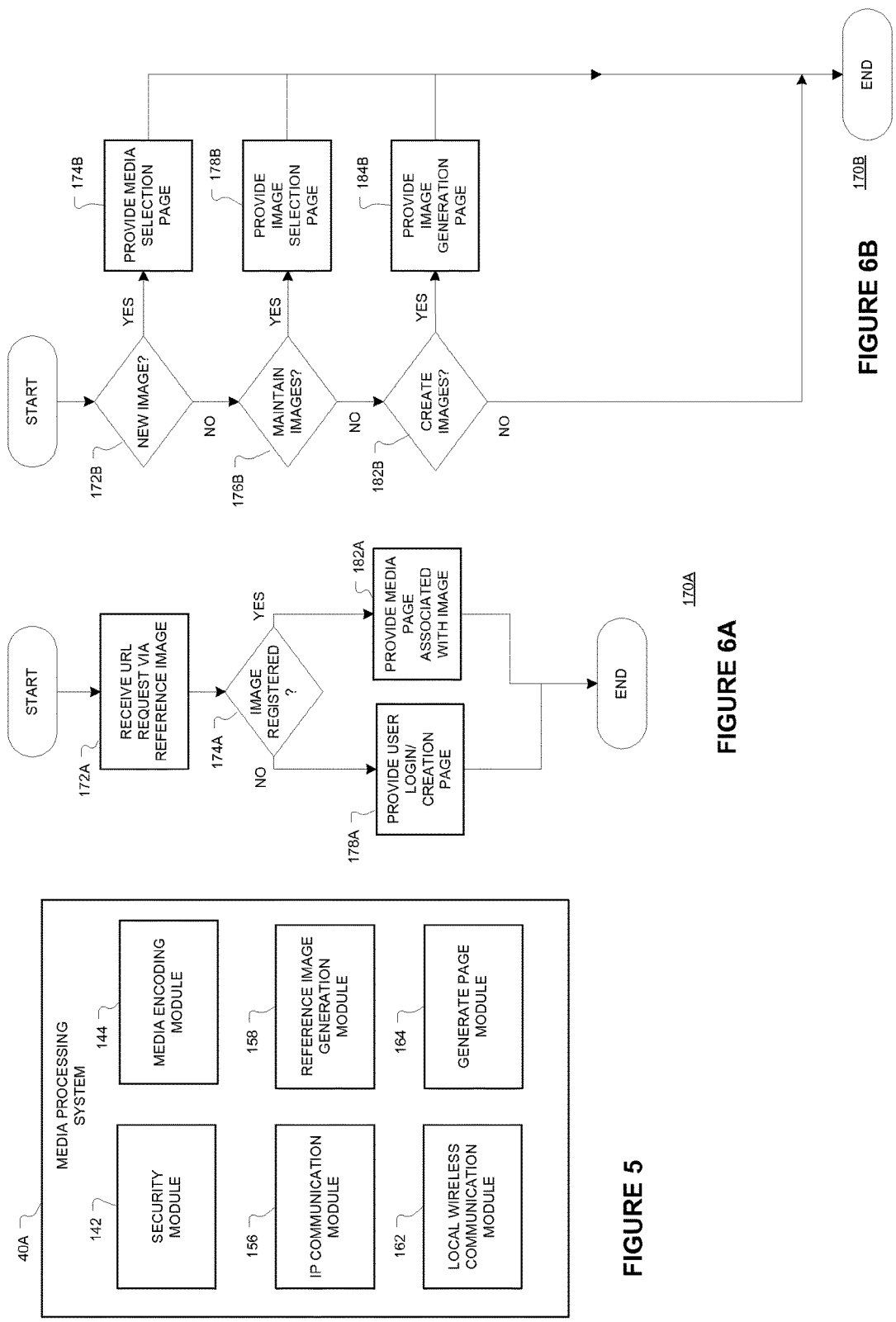

ARCHITECTURE, SYSTEM AND METHOD FOR DYNAMICALLY PROVIDING DIGITAL CONTENT VIA A REFERENCE IMAGE

CROSS REFERENCE TO RELATED APPLICATIONS

This application claims priority to U.S. Provisional Application 61/725,459, filed Nov. 12, 2012, Attorney docket 101001.0001PRO, and entitled "SYSTEMS AND METHODS FOR ASSOCIATING CONTENT TO DYNAMIC QUICK RESPONSE CODE STICKERS", which is incorporated in reference.

TECHNICAL FIELD

Various embodiments described herein relate generally to linking digital content to an image, including apparatus, systems, and methods used by electronic devices having a display.

BACKGROUND INFORMATION

It may be desirable to dynamically link an image to digital content to enable the content provider to dynamically change the associated content.

BRIEF DESCRIPTION OF THE DRAWINGS

FIG. 2A is a block diagram of a local web based image associated dynamic content (WBIADC) architecture according to various embodiments.

FIG. 3C is a diagram of reference image associated media maintenance communication between a media device and a media processing system in WBIADC architecture according to various embodiments.

FIG. 3D is a diagram of reference image generation communication between a media device and a media processing system in WBIADC architecture according to various embodiments.

FIG. 5 is a block diagram of a media processing system according to various embodiments.

FIG. 6A is a flow diagram illustrating several methods according to various embodiments.

FIG. 6B is a flow diagram illustrating several methods according to various embodiments.

DETAILED DESCRIPTION

Figure 1:
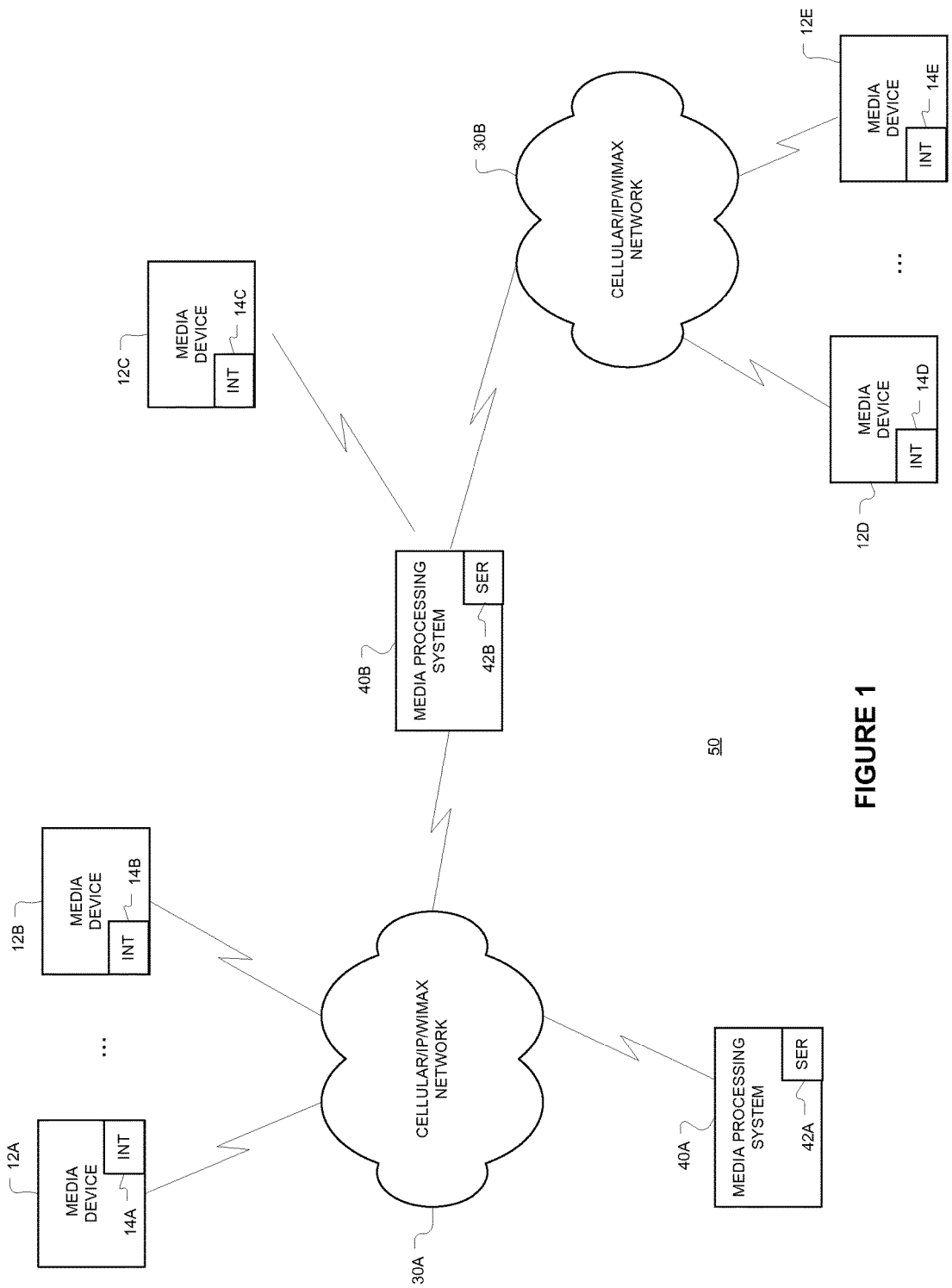
FIG. 1 is a block diagram of web based image associated dynamic content (WBIADC) architecture according to various embodiments.

FIG. 1 is a block diagram of web based image associated dynamic content (WBIADC) architecture 50 according to various embodiments. As shown in FIG. 1, architecture 50 includes a first and a second media processing system (MPS) 40A, 40B, several networked digital media devices (MD) 12A-E, and wireless networks 30A, 30B. In an embodiment, a media processing system (MPS) 40A may be a multimedia processing system that may communicate multimedia files to digital media devices (MD) 12A-E via a wired or wireless connection.

A MPS 40A, 40B may include a multimedia server 42A, 42B that may enable communication between a MPS 40A, 40B and a plurality of IP networked digital media devices (MD) 12A-E. A MPS 40A, 40B may employ an application specific integrated circuit (ASIC) (274 FIG. 7B) to transceive signals with one or more MD 12A-E. A MPS 40A, 40B server 42A, 42B may be a webserver that communicates data that may be processed by a web browser application resident on a MD 12A-E. In an embodiment, a MPS 40A, 40B server 42A, 42B may generate Hyper Text Markup Language (HTML) encoded data that a MD 12A-12E may process via a resident web browser.

In an embodiment, a MPS 40A, 40B server 42A, 42B may communicate data including media using other protocol including an application specific protocols. A MD 12A-12E may include a program to decode/encode the application specific protocol communications between the MD 12A-12E and a MPS 40A, 40B. As shown in FIG. 1, a MD 12A, 12B may be coupled a MPS 40A, 40B via a network 30A. The network 30A may be a local network or a network of networks. A MD 12C may be coupled directly to a MPS 40B via a wired or wireless connection. In another embodiment, a MD 12D, 12E may communicate with a MPS 40B via a network 30B.

The network 30A may be a local network or a network of networks. A MD 12A-12E may include an interface (network interface controller (NIC)) 14A-14E that enables IP based communication with a MPS 40A, 40B. The interface 14A-14E may include a modem/transceiver 244 (244, FIG.

7A). The modem/transceiver 244 may include an application specific integrated circuit (ASIC). The network 30A, 30B may be a local network, a network of networks, or a worldwide network of networks, termed the "Internet", cellular network, or WiMax networks. In an embodiment, a MD 12A-E may communicate with a MPS 40A, 40B via several networks. It is noted that in an embodiment, the networks 30A, 30B may be industrial, scientific and medical (ISM) radio bands, Groupe Spécial Mobile (GSM), Code-division multiple access (CDMA), time division multiple access (TDMA), mesh, and short messaging system (SMS) based network, WiMax, IP (wired or wireless network) such as 802.11a, b, g, n networks.

A network 30A, 30B may be a terrestrially based network or satellite based network, or combination thereof Each MD 12A to 12E may include an interface 14A to 14E that enables communication between a MD 12A-12E and a MPS 40A, 40B via a network 30A, 30B directly or indirectly. In an embodiment, a MD 12A-E may be cellular device such an iPhone® or other smartphone, tablet device including an iPad®, laptop, tablet, desktop, or other electronic device capable of communicating via one or more wired or wireless protocols and capable of electronically reading an image. In an embodiment, a MPS 40A, 40B may be an electronic device 260 that may include a module 274 to communicate signals with a MD 12A-12E. A MPS 40A, 40B may also include a server 42A, 42B (292, FIG. 7B).

In an embodiment, a media device 12A-12E may receive digital media content (245, FIG. 8D) from a MPS 40A-40B server 42A-42BA in response to a URL request from the MD 12A-12E (to a MPS 40A-40D), the URL and image associated with the digital media content. The digital media content may include video, audio, pictures, text, or any combination thereof. In an embodiment, a media device 12A-12E may use a camera 256 to electronically read, analyze, decode, or interpret a reference image (312) where reference image may include a directly encoded unique encoded uniform resource locator (URL) or uniform resource identifier (URI) that constitutes a reference to media content (245) stored in a database 48 of an MPS 40A-40D. The URL or URI may reference a domain name and a path within the domain that includes the associated media content. Upon receiving the URL or URI, a MPS 40A-40B server 42A-42B may forward the associated digital media content in a format usable by the requesting MD 12A-12E. It is noted the a URL or URI forwarded from a MD 12A-12E may also include information about MD 12A-12E including its model, media access control (MAC) address, user information, associated software (web browser in an embodiment) that generated the URL or URI, time of the URL or URI creation, operating system version, and location of MD 12A-12E when the URL or URI was created. In an embodiment, a MPS 40A-B may determine the MD 12A-12E related user based on the MD 12A-12E MAC or forwarded user information. A MD 12A-12E MAC address may be associated with the 12A-12E interface's network interface controller (NIC) 14A-14E.

As noted below, when a MD 12A-12E forwards a URL or URI request (generated from a reference image) that is not currently associated with digital media content, a MPS 40A-40B may respond with an account login/setup page or associated media content selection page for the reference image (237B, FIG. 8B, 237C, FIG. 8C). A MPS 40A-40B may forward the media selection page 237C for a new URL or URI (for a corresponding reference image 312) when the MD 12A-12E user is known or can be determined based on the received URL or URI request and is registered with the MPS 40A-40D. In another embodiment, a MPS 40A-40B server 42A-42B may always forward an account setup (or login page for a registered user) for any unassociated reference image 312 based on system security protocols. In an embodiment, a reference image may not include a directly encoded URL or URI but may be associated with a particular URL or URI. A MD 12A-12E may include a database of images (I-URL 234B, FIG. 7A) and their associated URL or URI. In an embodiment, a MD 12A-12E may determine whether a digital representation of an image matches an image in an image-URL database 234B and send a URL or URI request via its NIC 14A-14E and network 30A, 30B to MPS 40A, 40B when a corresponding image is located in the image-URL database 234B.

In an embodiment, the reference image 312 may include a quick response (QR) code. As known to those of skill in the art, a QR code is a two-dimensional bar code that is machine readable (via optics). A QR code may include encoded information include data (alphanumeric). As shown in FIG. 8A, a QR code may include block modules or square dots arranged on a square grid in a white background. A QR code 312 may be read by an MD 12A-12D imaging device 256 and processed by an application (APPS 237A) employing Reed-Solomon error correction to interpret data that is extracted from patterns in the horizontal and vertical components of the QR code image 312. A MD 12A-12E may include imaging modules 256 and include a QR code interpretation application (APPS 237A) as part of the MD 12A-12E standard operating system (may be stored in the device RAM 234 in an embodiment). In addition, a MD 12A-12E networked device including a display 247 may include one or more web browser applications or IP request processing applications or algorithms in standard or basic operation software, system, or algorithms (RAM 234 or ROM APPS 237A, FIG. 7A).

Accordingly, a user of a MD 12A-12E may be able to view digital media content associated with a reference image using standard (non-application specific) software/system/algorithms included in the basic software/system/algorithm package of MD 12A-12E and using IP communication. A user may also be able to associate digital media content 245 with a reference image 312 using standard or basic operation software, system, or algorithms of a MD 12A-12E including cellular phones, PDA, music players, laptops, tablets, desktops, and other electronic devices that include an imaging unit or module. A user may also be able to change the digital media content 245 to be associated with a reference image 312 using standard or basic operation software, system, or algorithms of a MD 12A-12E as desired (dynamically, in particular web based systems). In an embodiment, a MPS 40A, 40B may receive the associated digital media content and transcode via the media parser 44 (FIG. 4A) the content into different formats that may be required for the content to be viewable on various MD 12A-12E platforms.

Figure 4A:
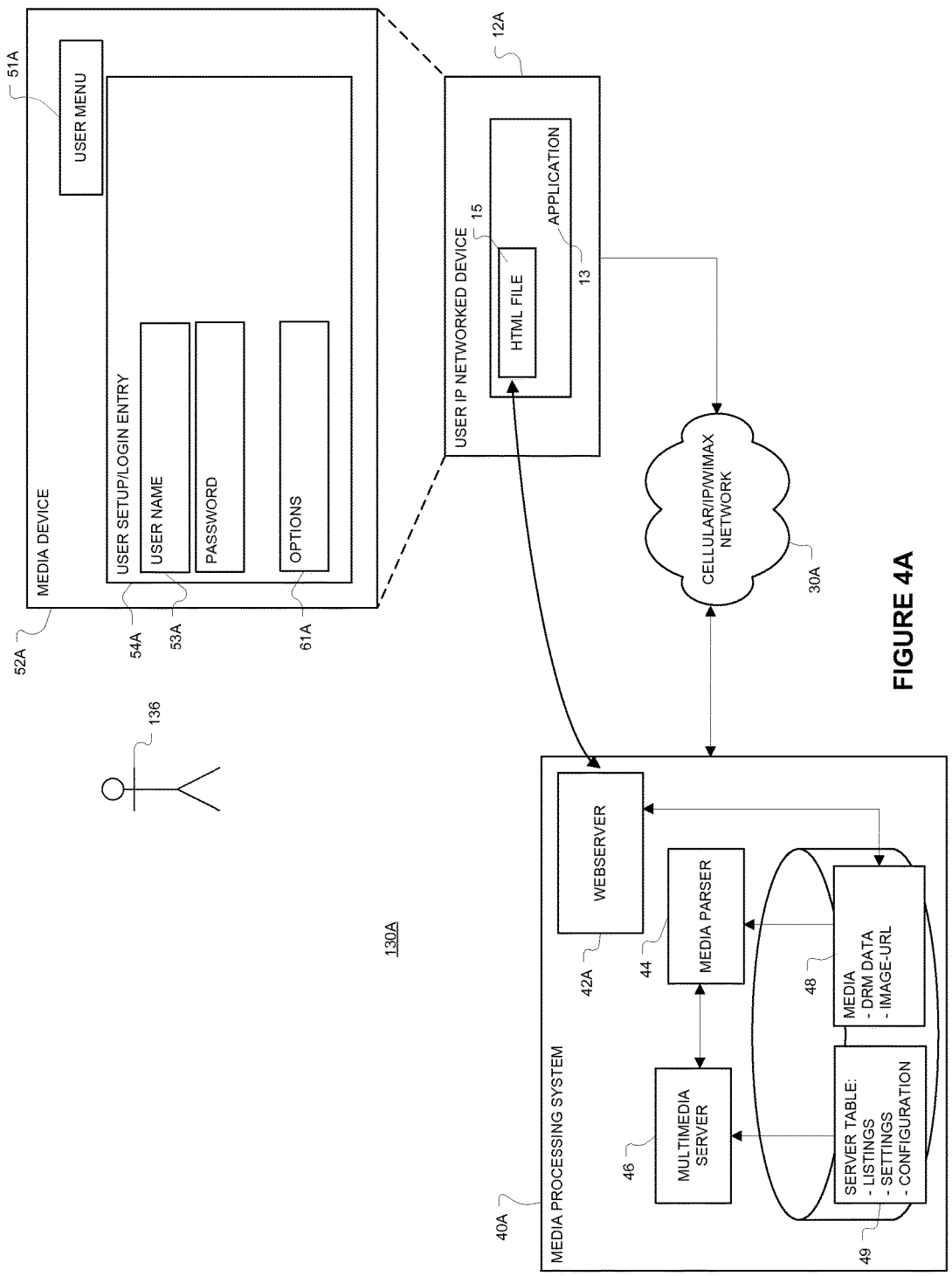
FIG. 4A is a block diagram of media processing system architecture providing a user setup/login web page according to various embodiments.
Figure 4B:
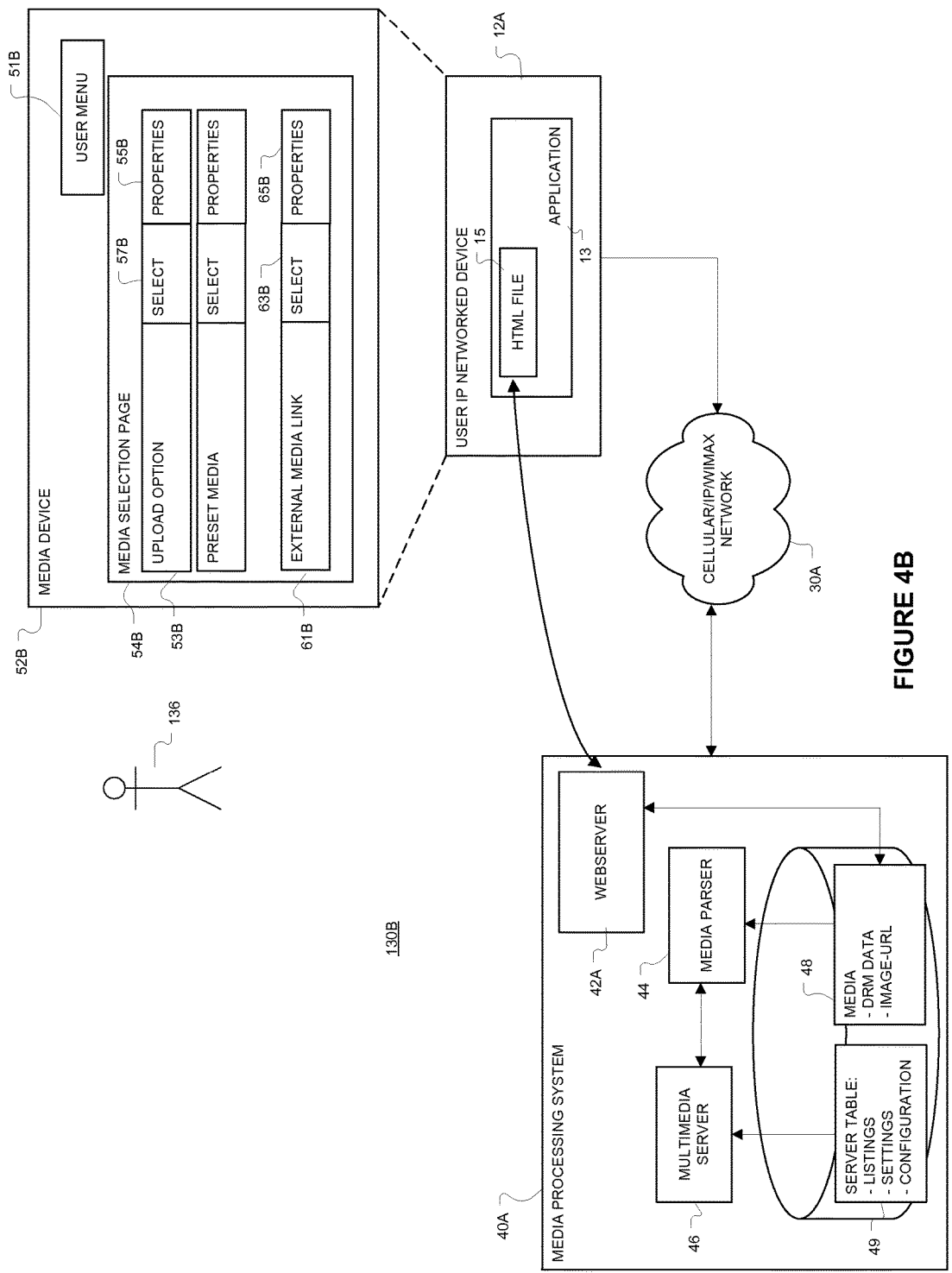
FIG. 4B is a block diagram of media processing system architecture providing a media selection web page according to various embodiments.

In an embodiment, associated media content may include video content. A user may generate the video content via a MD 12A-12E and upload the video content to a MPS 40A, 40B via a web browser application 237C (FIG. 8C) 54B (FIG. 4B). A MD 12A-12E may create digital video content using a device specific or other video encoding format, such as a version of H.264, MPEG, AVI, WMV, H.265, or other digital video format. Further, the video resolution and audio encoding may vary by device 12A-12E or user selection. A MPS 40A-40B may convert a received digital video content or media to one or more standard digital formats having one or more resolutions, and audio encoding. Accordingly, a user may be able to associate digital video content media with a reference image using one format and have other users view the content in other formats (by association with the reference image) using standard software-algorithms on their respective media devices 12A-12E.

Figure 2B:
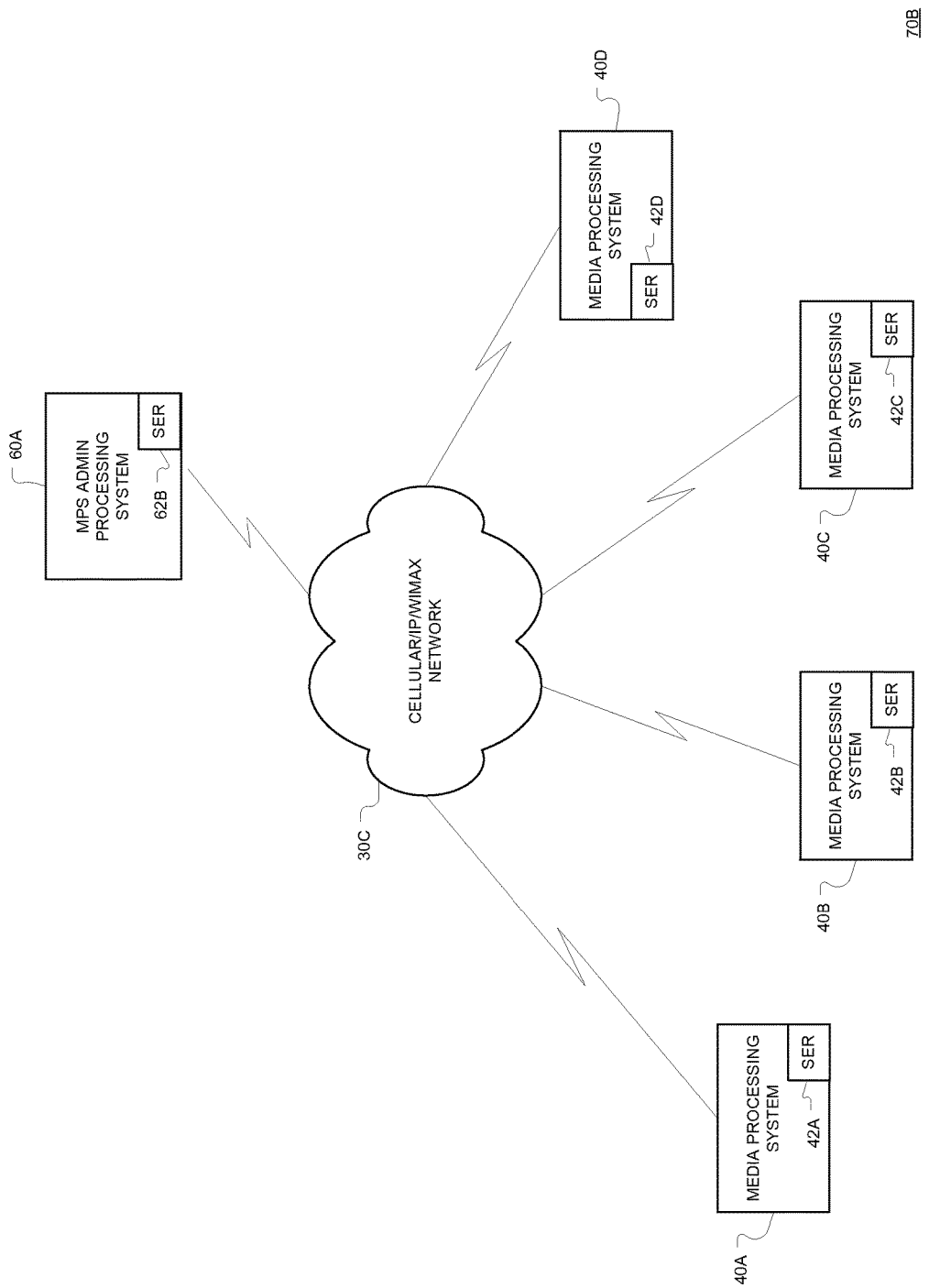
FIG. 2B is a block diagram of administration and multiple media processing system architecture according to various embodiments.

FIG. 2A is a block diagram of a local web based image associated dynamic content (WBIADC) architecture 70A according to various embodiments. As shown in FIG. 2A, architecture 70A may include a MPS 40A couplable to a plurality of MDs 12A-12D via a network 30A. The network 30A may be a local network or a network of networks in an embodiment. The network 30A may include one more wireless communication devices include a wireless router, hub, and an Apple® airport express. FIG. 2B is a block diagram of administration and multiple media processing system architecture 70B according to various embodiments.

As shown in FIG. 2B, architecture 70B may include a MPS administration processing system (MAPS) 60A couplable to a plurality of MPSs 40A-40D via a network 30C. The network 30C may be a local network or a network of networks in an embodiment. In an embodiment, a MAPS 60A may correlate or duplicate server 42A-42D content (including databases 48, 49, FIGS. 4A-4E) across multiple MPS 40A-40C. Architecture 70B may employ multiple MPS 40A to 40D to reduce system lag for MDs 12A-12E located at different locations in a network or network of networks 30C. When a change is made at a first MPS 40A-40D, the MAPS 60A may propagate the change to other MPS 40A-40D including digital media content, user, and reference image changes (or other changes to databases 48, 49).

Figures 3A, 3B:
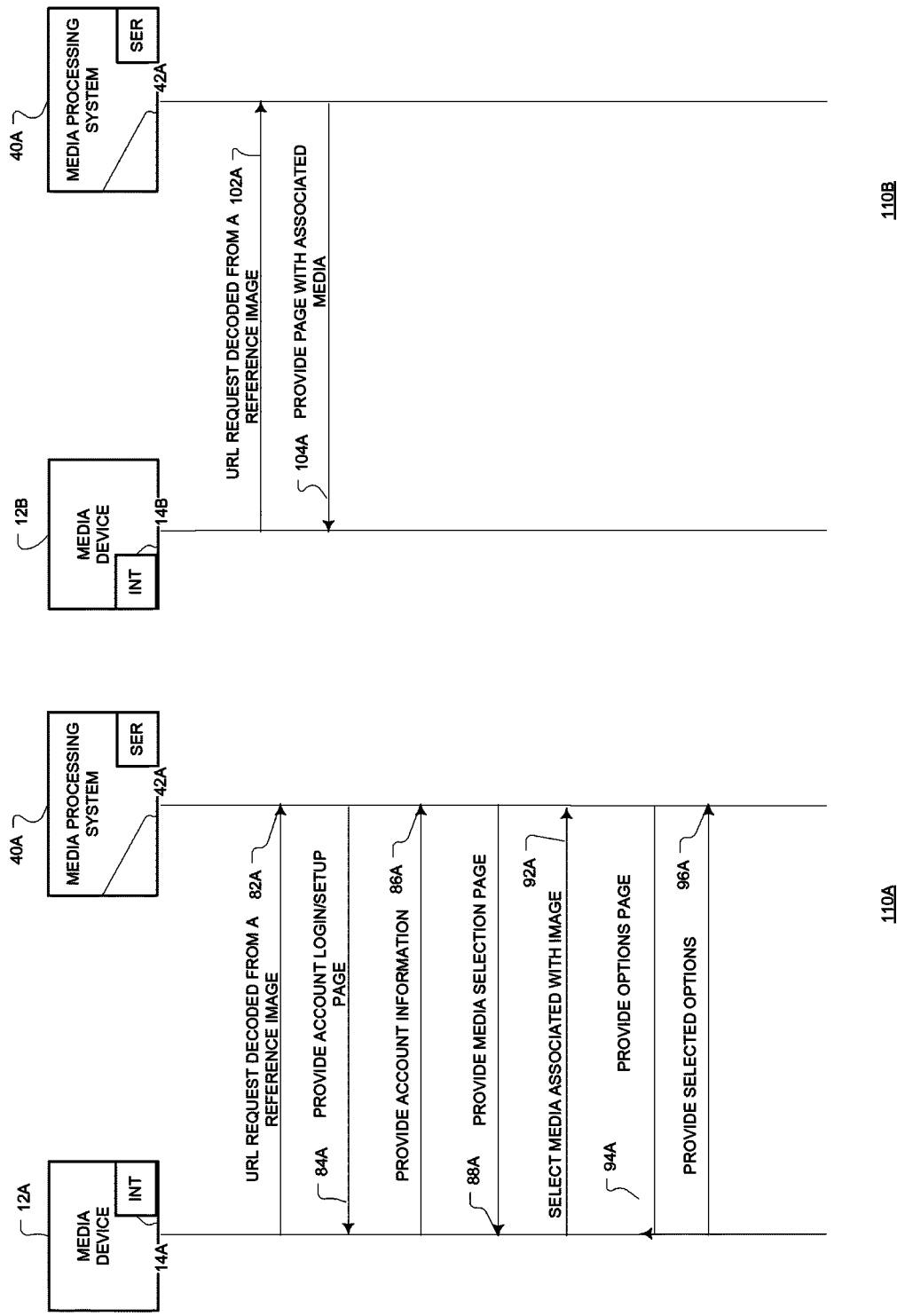
FIG. 3A is a diagram of account login/setup and image association communication between a media device and a media processing system in WBIADC architecture according to various embodiments.
FIG. 3B is a diagram of reference image associated media display communication between a media device and a media processing system in WBIADC architecture according to various embodiments.

FIG. 3A is a diagram of account setup/login and image association communication 110A between a media device 12A and a media processing system 40A in WBIADC architecture according to various embodiments. Via a MD 12A, a user may generate a URL or URI request from a reference image 82A and send the request to a MPS 40A, 40B via its NIC 14A and a network 30A, 30B. Via the network 30A, 30B, IP protocols, and its transceiver 244 (FIG. 7A), a MPS 40A may receive the URL/URI request. As shown in FIG. 8A, a user 320 may employ a MD 12A to scan or digitally read a reference image 312 on or in a fixed medium 310. In an embodiment, the fixed medium 310 may be printed medium including a card, flyer, poster, paper sheet, clothing, tattoo, or other printed, fixed medium. In an embodiment, a reference image 312 may read by a MD 12A-12D on a changing medium including various electronic displays (computer, television, projected, and others).

As shown in FIG. 8A, the fixed medium 310 may be a greeting card including at least one reference image 312. As user 320 may purchase or create the card 310 including the reference image 312. The user 320 may desire to associate digital content media that another user may view via a MD 12A-12E by employing their MD 12A-12E to read the image via an image reading application or software 237A as shown in FIG. 8A. The user 320 may change the associated digital content media for the reference image 312 as desired. Another user may then employ their MD 12A-12E to read the image via an image reading application or software 237A as shown in FIG. 8A to invoke another application (web browser 237D, FIG. 8D) to view the updated or changed digital media content via an IP request and response to the associated URL/URI. Accordingly, a user 320 may then dynamically provide digital media content associated with a reference image 312 for viewing by the user or other parties that the user has provided the reference image. It is noted that the reference image 312 may also be presented on an electronic display 247 that a party or user 320 reads via their MD 12A-12E.

In an embodiment, a user 320 may create or purchase a greeting card 310 including a reference image 312. The reference image 312 may be associated with a preset digital media content (such a picture of a holiday scene or holiday themed video) stored in a MPS 40A, 40B database 49. In another embodiment, the reference image 312 may be associated with a generic image that may indicate content that has not been uploaded by a user 320 yet. In a further version, when a user 320 first scans a reference image not currently associated with a URL/URI that is not associated with digital media content, a MPS 40A-40B may provide a user creation or login page 54A (FIG. 4A), 237B (FIG. 8B). In each case, a user 320 via their MD 12A-12E may generate a URL or URI request by decoding the reference image or evaluating a URL to image database 234B to determine an associated URL/URI request. The MD 12A-12E ma then forward the URL/URI request to a MPS 40A-40D via its NIC 14A-14E and the IP based network 30A, 30B in an embodiment. A MPS 40A, 40B may employ process or algorithm 170A shown in FIG. 6A upon receiving a URL or URI request associated with a reference image (82A, FIG. 3A), (102A, FIG. 3B) (activity 172A).

When the URL or URI associated with a reference image 312 is not yet registered by a user 320 in a MPS 40A, 40B (activity 174A), a MPS 40A, 40B may provide an account login/setup web page 84A (FIG. 3A), 237B (FIG. 8B), 54A (FIG. 4A) (by forwarding the web page to the MD 12A via an IP network 30A, 30B. As shown in FIG. 4A, a media processing system 40A may include a digital media, content database 48, a user, image, and configuration database 49, a multimedia server 46, a media parser 44, and a webserver 42A. As shown in FIG. 5, a MPS 40A may include a security module 142, a media encoding module 144, a IP communication module 156, a reference image generation module 158, a local wireless communication module 162, and a generate web page module 164. As noted above, a URL or URI request may also include data about the MD 12A-12E that created the URL or URI request. A MPS 40A, 40B may correlate the request 82A to a registered user 320 based on the MD 12A-12E identifier (MAC in an embodiment). The correlation between a user 320 and device 12A-12E may be stored in database 49 (FIG. 4A).

A MPS 40A, 40B may provide a user login/creation page 84A (FIG. 3A) in communication 110A, page 54A, FIG. 4A, web page 237B (FIG. 8B), activity 178A (FIG. 6A) for a received URL or URI request that is not registered to a user. The database 49 may include a table that links one or more users with a URL or URI, where the URL or URI is further associated with a reference image (or decoded from a reference image 312). In response to a received user login/creation page communication 84A (FIG. 3A) web page 54A, FIG. 4A, web page 237B (FIG. 8B), a user 320 via a MD 12A-12E may create an account or login to an account. A user may be able to select a user name and password 53A (or enter same if registered to login) and select one or more options 61A. The options may include privacy settings, user demographics, a registered MD 12A-12E to be associated with the MPS 40A, 40B, and other options.

Figure 4C:
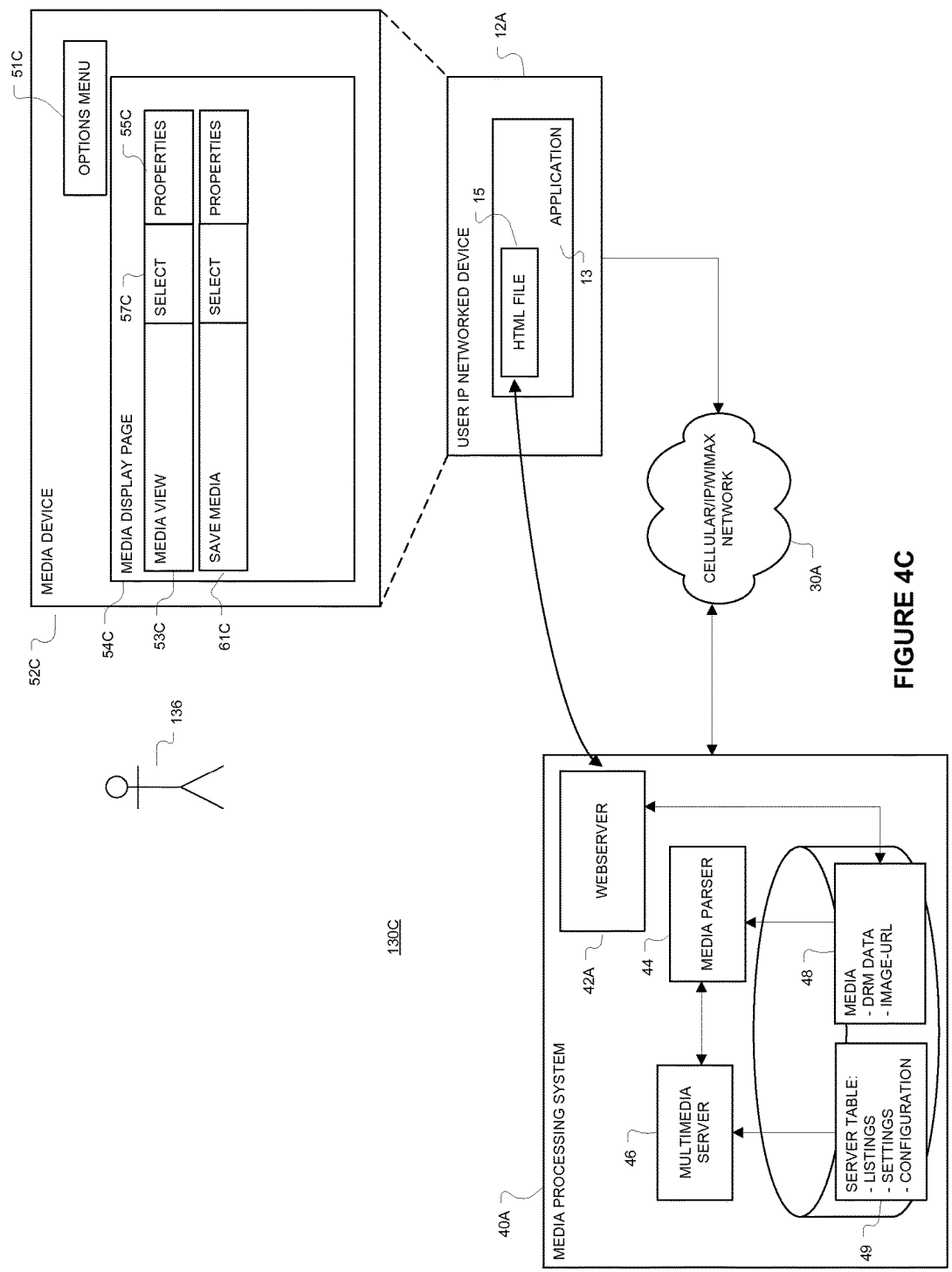
FIG. 4C is a block diagram of media processing system architecture providing a media display web page according to various embodiments.
Figure 8A:
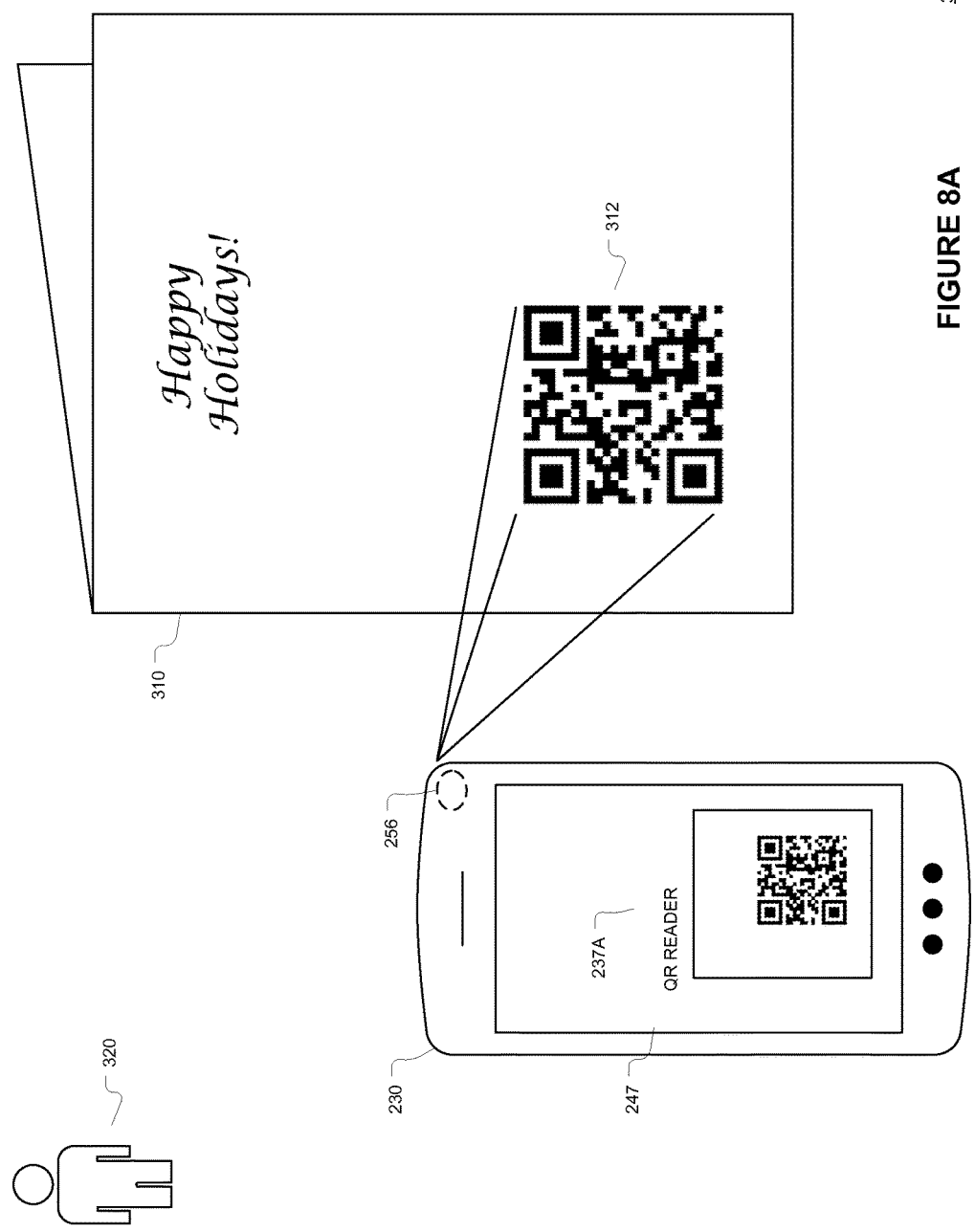
FIG. 8A is a simplified diagram of a media device capturing a reference image according to various embodiments.
Figure 8D:
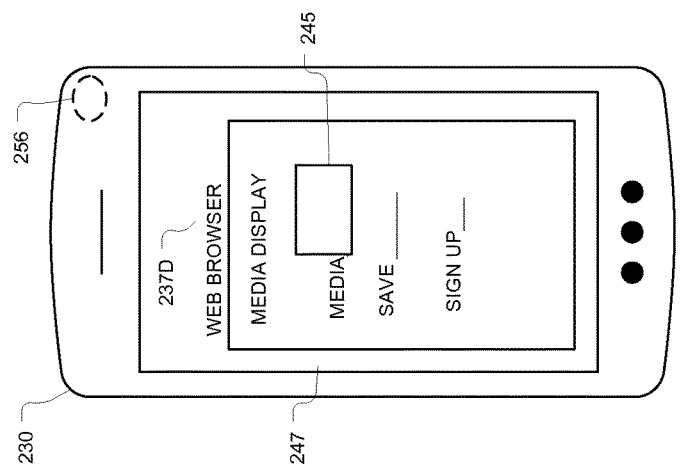
FIG. 8D is a simplified diagram of a media device displaying a basic associated media display web page according to various embodiments.

When the URL or URI associated with a reference image 312 has been registered by a user 320 in a MPS 40A, 40B (activity 174A), a MPS 40A, 40B may provide an associated digital media content display web page 104A (FIG. 3B), 237D (FIG. 8D), MC (FIG. 4C) (activity 182A, FIG. 6A) (via network 30A, 30B). FIG. 3B is a diagram of media display communication between a media device 12A-12E and a media processing system 40A, 40B in WBIADC architecture according to various embodiments (where communication may be IP communication on a network 30A, 30B). A MPS 40A may determine the URL or URI is registered via database 49 (FIG. 4C) as noted above. A MPS 40A, 40B, may retrieve digital content media associated with the URL/URI (and the reference image 312) from a database 48. A MPS 40A, 40B may retrieve and provide different formats of the digital content media 245 (FIG. 8D) based on information about the requesting device 12A-12E or user options. A MPS 40A, 40B may also vary provided digital media content based on the information in the URL/URI request 102A, which may include user information, demographics, device information 12A-12E, and date/time of the URL/URI request generation. A user 320 via a media association selection page (237C, FIG. 8C), (54B, FIG. 4B), may provide multiple versions of digital content media to be associated with a URL/URI (and the reference image 312) based on options or variables. As shown in FIG. 3A, a MPS 40A, 40B may provide a media selection page 88A. As shown in FIG. 8D and FIG. 4C, a user via a MD 12A-12E may be able to save or download a version of the digital media content and register with a MPS 40A, 40B.

In an embodiment shown in FIG. 4B, the media selection page 54B may enable a user 320 to upload media 53B, select preset media, or provide a link to external media 61B to be associated with a URL/URI image. The media to be uploaded may be stored or created by a MD 12A-12E by a user 320. The preset media may be digital media content that a user 320 may select from the MPS 40A, 40B. The user may also search or provide a link to an external digital media content 61B. As noted above, a MPS 40A, 40B may retrieve the digital media content (as uploaded or from an external location) and generate different versions of the media for viewing by different device types 12A-12E via the media encoding module 144 (FIG. 5), media parser 44 and multimedia server 46 (FIG. 4B). The encoded digital media content may be stored in the database 48 of a MPS 40A, 40B (FIG. 4C). As noted, a user 320 may associate various properties 55B, 65B with digital media content including user restrictions, demographics restrictions, time parameters or other restrictions (changes or expires with time), and other parameters.

In an embodiment, a MPS 40A, 40B upon receipt of a registered URL, URI (associated with a reference image 312) may determine if the URL/URI request was sent by a media device 12A-12E associated with a registered user. If the registered URL/URI is associated with a register user, a MPS 40A, 40B may provide a media selection page 237C (FIG. 8C), 54B (FIG. 4B). A user 320 via a MD 12A-12E may change digital media content associated with the registered URL/URI. Accordingly, a content creator may also use a reference image to modify, delete, add, or change options with digital media content associated with the reference image via the encoded or associated image (via database I-URL 234B, FIG. 7A) dynamically.

Figure 4D:
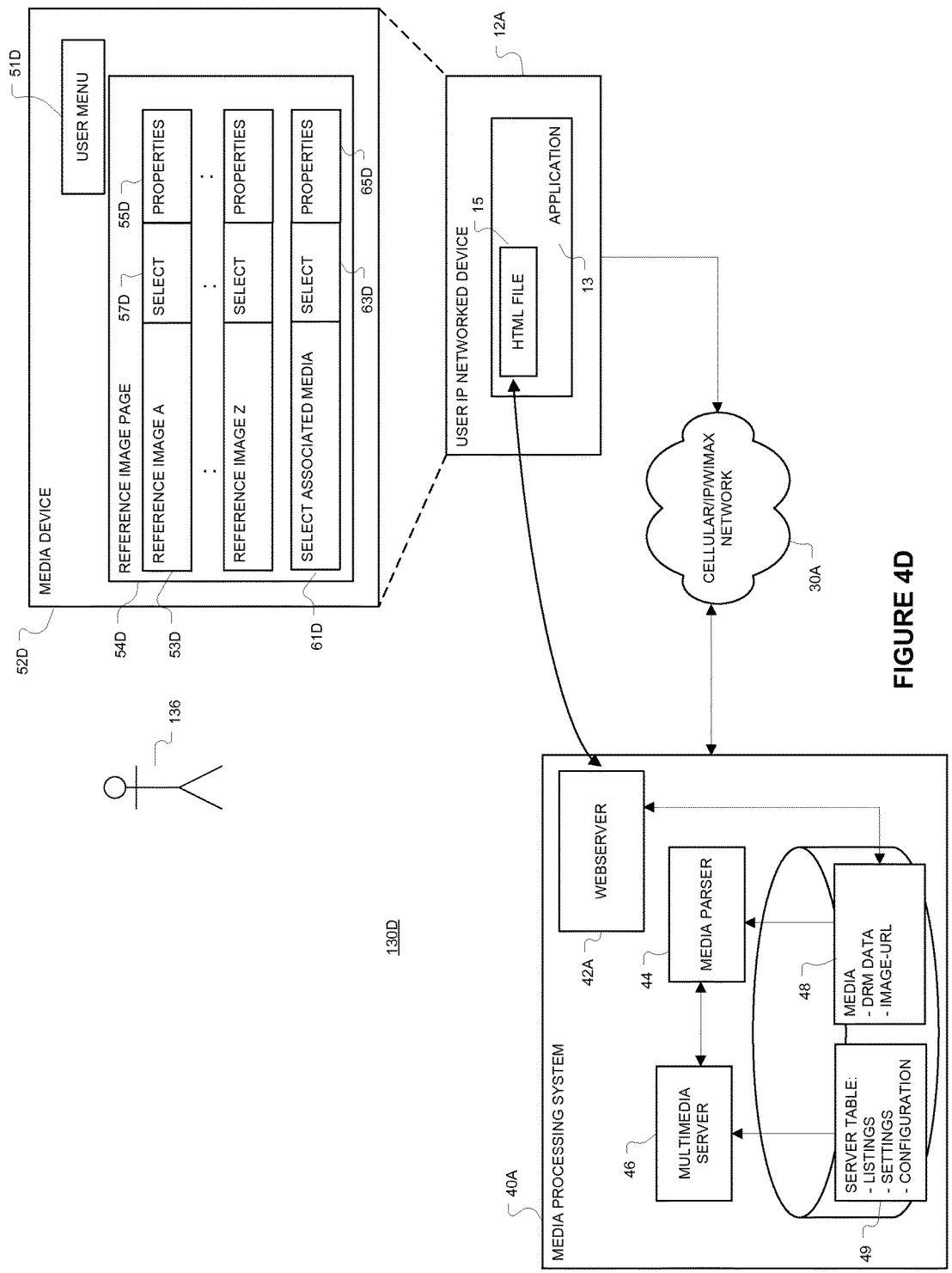
FIG. 4D is a block diagram of media processing system architecture providing a reference image media association web page according to various embodiments.

FIG. 3C is a diagram of digital media content 245 maintenance communication 110C between a media device 12A-12E and a media processing system 40A, 40B in WBIADC architecture according to various embodiments. FIG. 4D is a block diagram of media processing system architecture 130D providing a reference image digital media content association web page 54D according to various embodiments. FIG. 6B is a flow diagram 170B illustrating several methods for reference image processing for registered users according to various embodiments. As shown in FIG. 6B, when a MPS 40A-D receives a URL/URI associated with an unregistered or unassigned (to digital media content) reference image 312 (activity 172B), a MPS 174B may provide/forward/send a media selection web page 237C in FIG. 8C, MB in FIG. 4B as described above (activity 174B). When a registered user 320 wants to maintain one or more assigned reference images (activity 176B), a MPS 40A-D may provide a web page 54D shown in FIG. 4D and employ the communication 88B to 86B in FIG. 3C (activity 178B).

As shown in FIG. 3C, after optionally verifying user registration (communications 84B to 85B), a MPS 40A-40D may provide/send a main options page that may enable a user to maintain assigned reference images, digital content media, and generate new reference images. When a user 320 selects reference image maintenance option (communication 86B), a MPS 40A-40D may provide a web page 54D shown in FIG. 4D (communication 86B). A user 320 via a MD 12A-12E may select one or more reference images to be maintained 53D, 57D, and properties/options for same 55D (FIG. 4D) including deleting the reference images. A user 320 via a MD 12A-12E may also select digital media content to be associated with one or more reference images (or their respective URL/URI) along with properties/options 61D, 63D, 65D (FIG. 4D) (communications 90B to 96B in FIG. 3C). In algorithm 170B shown in FIG. 6B, a user 320 via a MD 12A-12E may also select to generate new reference images (activity 182B).

Figure 4E:
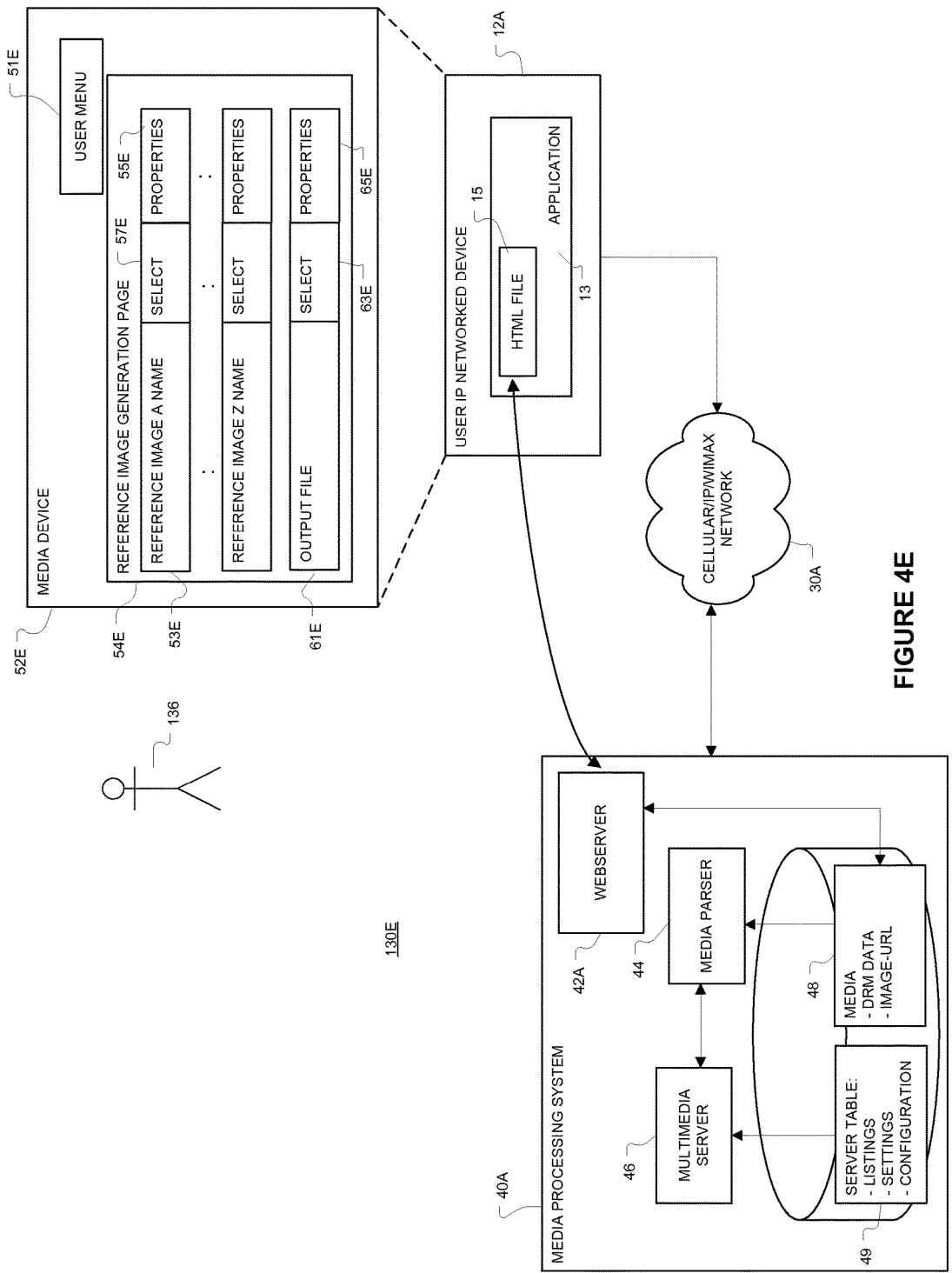
FIG. 4E is a block diagram of media processing system architecture providing a reference image generation web page according to various embodiments.

FIG. 3D is a diagram of reference image generation communication 110D between a media device 12A-12E and a media processing system 40A-40D in WBIADC architecture according to various embodiments. FIG. 4E is a block diagram of media processing system 40A-40E architecture 130E providing a reference image generation web page according to various embodiments. A user 320 via a MD 12A-12E after verifying system registration and requesting a reference image generation option from a main options page (communications 84C, 86C, 85C, 86C), may receive a reference image generation web page 54E (communication 88C) from a MPS 40A-40D (activity 184B of algorithm 170B). As shown in FIG. 4E, a reference image generation web page 54E may enable a user to generate, name, and elect properties 53, 57E, 55E for one or more reference images. A user 320 via a MD 12A-12E may provide limitations on the reference image usage via properties including limiting users, time frame (expiration date), and other parameters.

As shown in FIG. 4E, a user 320 via a MD 12A-12E may also select an output file destination for the selected reference images and properties for the file (61E, 63E, 65E). The generated reference images may be provided in various data formats including PDF, Visio, Word, or others and delivered to a user 320 via E-mail or downloaded via the selection option 63E (communications 90C, 92C). A MPS 40A-40D may store the new reference images (the associated URL/URI) in the database 49 along with the user registered to associate media with the images. In an embodiment, the MPS 40A-40D may provide database entries for a MD 12A-12D image-URL database 234B when the reference image is not encoded with the corresponding URL/URI.

In an embodiment, a MPS 40A-40D media database 48 may also include an image-URL database. A MD 12A-12D may create a digital copy of a reference image and forward the digital copy to a MPS 40A-40D via a web page. The MPS 40A-40D may provide a web page where a user 320 via a MD 12A-12D may upload a reference image digital copy. A MPS 40A-40D may receive the reference image digital copy from a MD 12A-12D and search an image-URL damage for a correlated image. When a correlated image is located in the database 48 (within an acceptable degree), a MPS 40A-40D may locate the associated digital media content in database 48. A MPS 40A-40D may then generate and forward (via a network 30A, 30B) a web page including the associated digital media content to the requesting MD 12A-12D (and user 320).

Figure 7B:
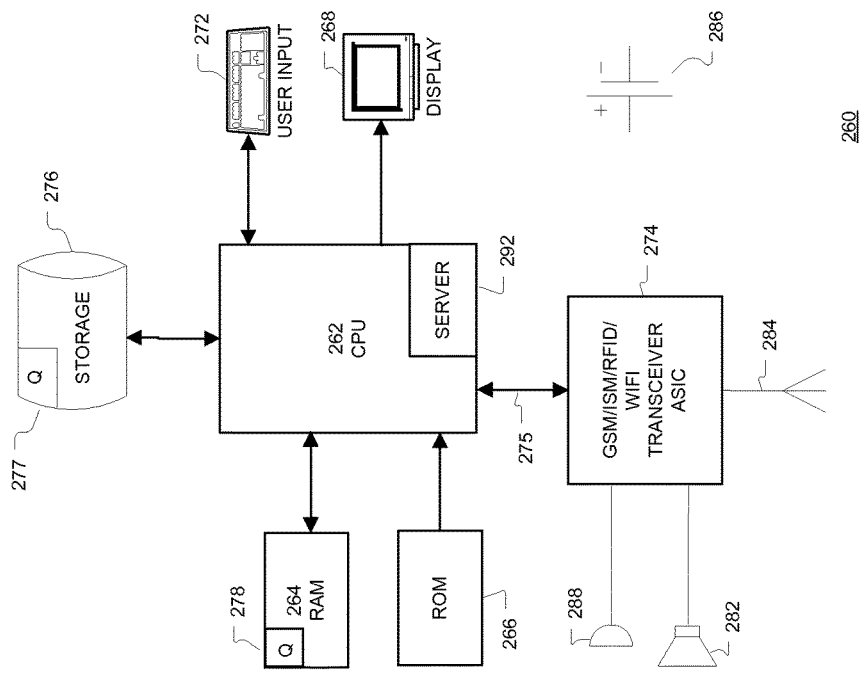
FIG. 7B is a block diagram of an article according to various embodiments.
Figure 7A:
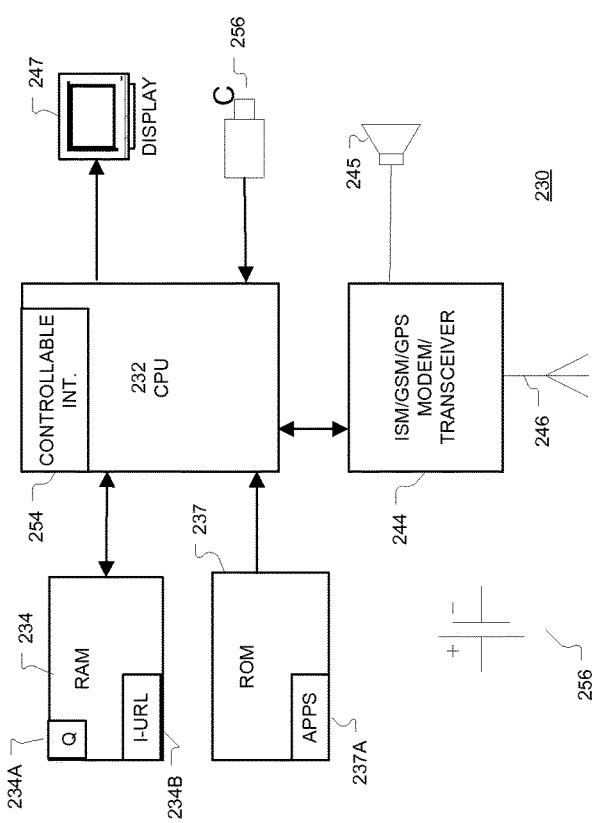
FIG. 7A is a block diagram of an article according to various embodiments.
Figure 8C:
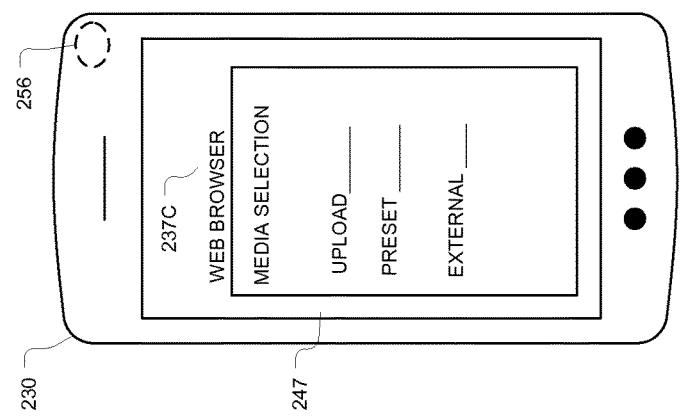
FIG. 8C is a simplified diagram of a media device displaying a basic media association selection web page according to various embodiments.
Figure 8B:
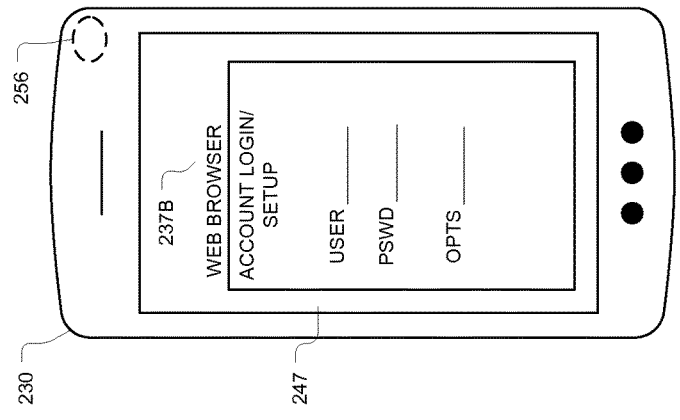
FIG. 8B is a simplified diagram of a media device displaying a basic account login/setup web page according to various embodiments.

FIG. 7A illustrates a block diagram of a device 230 that may be employed at least in part in a MD 12A-12D in various embodiments. The device 230 may include a central processing unit (CPU) 232, a random access memory (RAM) 234, a read only memory (ROM) 237, a local wireless/GPS modem/transceiver 244, a display 247, a camera 256, a speaker 245, a rechargeable electrical storage element 256, and an antenna 246. The CPU 232 may include a control interface 254 including an IP type network controller interface (NIC). The RAM 234 may include a queue or table 248 where the queue 248 may be used to store web pages. The RAM 234 may also include a reference image to URL/URI database 234B. The RAM 234 may also include program, algorithm, and system data and instructions. The rechargeable electrical storage element may be a battery or capacitor in an embodiment.

The modem/transceiver 244 may couple, in a well-known manner, the device 230 to a wired or wireless network 30A, 30B to enable communication with a MPS 40A-40D. The modem/transceiver 244 may also be able to receive global positioning signals (GPS) and the CPU 232 may be able to convert the GPS signals to location data that may be stored in the RAM 234 and provided to a MPS 40A-40D with a URL/URI request. The ROM 237 may store program instructions to be executed by the CPU 232 or control interface 254 (applications 237A). The applications 237A may include a reference image read program or application and a web browser program or application. The RAM 234 may also be used to store program information, queues, databases, and overhead information.

FIG. 7B illustrates a block diagram of a device 260 that may be employed at least in part in a MPS 40A-40D in various embodiments. The device 260 may include a central processing unit (CPU) 262, a random access memory (RAM) 264, a read only memory (ROM) 266, a display 268, a user input device 272, a transceiver application specific integrated circuit (ASIC) 274, a microphone 288, a speaker 282, storage 276, electrical energy storage unit 286, and an antenna 284. The CPU 262 may include a server 292. The RAM 264 may include a queue 278 where the queue 278 may store reference image and digital media content data. The server 292 may function as the web-server/e-mail processor 42A, 42B of the MPS 40A, 40B.

The ROM 266 is coupled to the CPU 262 and may store the program instructions to be executed by the CPU 262 and the server 292. The ROM 266 may include applications and instructions for the webserver 42A, media parser 44, multimedia server 46, security module 142, media encoding module 144, IP communication module 156, reference image generation module 158, local wireless communication module 162, and generate page module 164. The RAM 264 may be coupled to the CPU 262 and may store temporary program data, overhead information, and the queues 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear multimedia content.

The microphone 288 and speaker 282 may be incorporated into the device 260. The microphone 288 and speaker 282 may also be separated from the device 260. Received data may be transmitted to the CPU 262 via a serial bus 275 where the data may include messages, reference images, or pages received, messages, digital media content to be or associated with reference images, or web pages to be transmitted, or protocol information. The transceiver ASIC 274 may include an instruction set necessary to communicate messages or web pages via network 30A, 30B. The ASIC 274 may be coupled to the antenna 284 to communicate messages, content, or pages wireless. When a message is received by the transceiver ASIC 274, its corresponding data may be transferred to the CPU 262 via the serial bus 276. The data can include wireless protocol, overhead information, sensor, and pages to be processed by the device 260 in accordance with the methods described herein.

The rechargeable electrical storage element 286 may be a battery or capacitor in an embodiment. The storage 276 may be any digital storage medium and may be coupled to the CPU 262 and may store temporary program data, overhead information, and databases 48, 49.

Any of the components previously described can be implemented in a number of ways, including embodiments in software. Any of the components previously described can be implemented in a number of ways, including embodiments in software. Thus, the devices 230, 260 elements including the RAM 234, ROM 237, CPU 232, transceiver 244, storage 276, CPU 262, RAM 264, ROM 266, and transceiver ASIC 274, may all be characterized as "modules" herein.

The modules may include hardware circuitry, single or multi-processor circuits, memory circuits, software program modules and objects, firmware, and combinations thereof, as desired by the architect of the architecture 10 and as appropriate for particular implementations of various embodiments.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into the Detailed Description, with each claim standing on its own as a separate embodiment.

What is claimed is:

1. A method of providing digital media content to an electronic device including an image reading mechanism based on an associated reference image, comprising:
storing first and second digital media content in a database;
associating a first uniform resource locator (URL) with a first reference image and associating a second URL with a second reference image, the first reference image including a quick response code decodable by an electronic device into the first URL and the second reference image including a quick response code decodable by an electronic device into the second URL;
creating a first web page including the first digital media content for the first URL associated with the first reference image;
creating a second web page including the second digital media content for the second URL associated with the second reference image;
receiving one of the first URL associated with the first reference image, the first reference image, the second URL associated with the second reference image, and the second reference image from an electronic device via a network; and
forwarding the corresponding one of the first web page including the first digital media content and the second web page including the second digital media content to the electronic device via a network based on the one of the first URL associated with the first reference image, the first reference image, the second URL associated with the second reference image, and the second reference image received from an electronic device, the first web page including the first digital media content and the second web page including the second digital media content viewable by a User of the electronic device via a web page viewing application.

2. The method of providing digital media content to an electronic device of claim 1, wherein the first URL is digitally encoded in the associated first reference image and the second URL is digitally encoded in the associated second reference image and the electronic device includes an application that can decode the first URL from the first reference image and the second URL from the second reference image, receiving one of the decoded first URL associated with the first reference image and the decoded second URL associated with the second reference image from an electronic device via a network and forwarding the corresponding one of the first web page including the first digital media content and the second web page including the second digital media content to the electronic device via a network based on the one of the decoded first URL associated with the first reference image and the decoded second URL associated with the second reference image received from an electronic device.

3. The method of providing digital media content to an electronic device of claim 1, wherein one of the first reference image and the second reference image is viewable by an electronic device user in a fixed medium.

4. The method of providing digital media content to an electronic device of claim 1, wherein the first digital media content and the second digital media content include one of video, audio, and image content.

5. The method of providing digital media content to an electronic device of claim 1, wherein the first digital media content and the second digital media content includes video content.

6. The method of providing digital media content to an electronic device of claim 1, further comprising receiving digital media content from another electronic device to be associated with one of the first reference image and the second reference image and storing the digital media content in the database.

7. The method of providing digital media content to an electronic device of claim 6, further comprising converting the received digital media content into different media formats and storing the digital media content in different media formats in the database.

8. The method of providing digital media content to an electronic device of claim 7, further including creating a web page including the one of the different media formats of the digital media content based on an electronic device to receive the web page.

9. A media processing system for providing digital media content to an electronic device including an image reading mechanism based on an associated reference image, comprising:
an electronic storage apparatus for storing a database including first and second digital media content;
a processor for associating a first uniform resource locator (URL) with a first reference image and associating a second URL with a second reference image, the first reference image including a quick response code decodable by an electronic device into the first URL, the second reference image including a quick response code decodable by an electronic device into the second URL, and creating a first web page including the first digital media content for the first uniform resource locator (URL) associated with the first reference image and a second web page including the second digital media content for the second uniform resource locator (URL) associated with the second reference image;
a communication apparatus for receiving one of the first URL associated with the first reference image, the first reference image, the second URL associated with the second reference image, and the second reference image from an electronic device via a network and forwarding the corresponding one of the first web page including the first digital media content and the second web page including the second digital media content to the electronic device via a network based on the one of the first URL associated with the first reference image, the first reference image, the second URL associated with the second reference image, and the second reference image received from an electronic device, the first web page including the first digital media content and the second web page including the second digital media content viewable by a User of the electronic device via a web page viewing application.

10. The media processing system for providing digital media content to an electronic device of claim 9, wherein the first URL is digitally encoded in the associated first reference image and the second URL is digitally encoded in the associated second reference image and the electronic device includes an application that can decode the first URL from the first reference image and the second URL from the second reference image, the network interface module receiving one of the decoded first URL associated with the first reference image and the decoded second URL associated with the second reference image from an electronic device via a network and forwarding the corresponding one of the first web page including the first digital media content and the second web page including the second digital media content to the electronic device via a network based on the one of the decoded first URL associated with the first reference image and the decoded second URL associated with the second reference image received from an electronic device.

11. The media processing system for providing digital media content to an electronic device of claim 9, wherein one of the first reference image and the second reference image is viewable by an electronic device user in a fixed medium.

12. The media processing system for providing digital media content to an electronic device of claim 9, wherein the first digital media content and the second digital media content include one of video, audio, and image content.

13. The media processing system for providing digital media content to an electronic device of claim 9, wherein the first digital media content and the second digital media content includes video content.

14. The media processing system for providing digital media content to an electronic device of claim 9, further comprising the communications apparatus for receiving digital media content from another electronic device to be associated with one of the first reference image and the second reference image and storing the digital media content in the database.

15. The media processing system for providing digital media content to an electronic device of claim 14, the processor further for converting the received digital media content into different media formats and storing the digital media content in different media formats in the database.

16. The media processing system for providing digital media content to an electronic device of claim 15, the processor for creating a web page including the one of the different media formats of the digital media content based on an electronic device to receive the web page.

* * * * *